Aug. 10, 1965  R. C. RAMER  3,199,133
ADJUSTABLE DOCKBOARD WITH IMPROVED LIP-LIFTING AND HOLDING MEANS
Filed Oct. 9, 1962  3 Sheets-Sheet 1
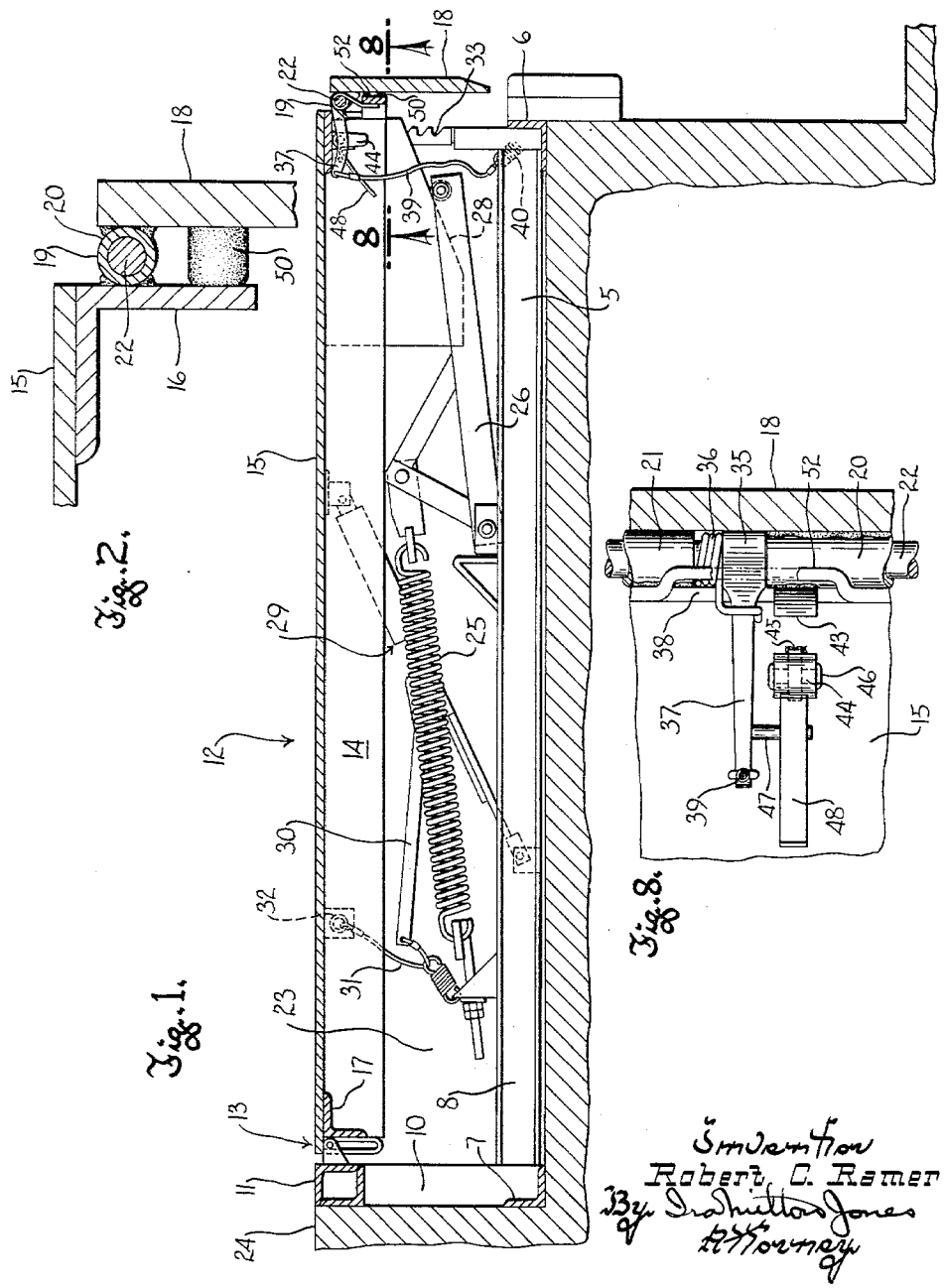
INVENTOR
Robert C. Ramer
By Ira Milton Jones
Attorney

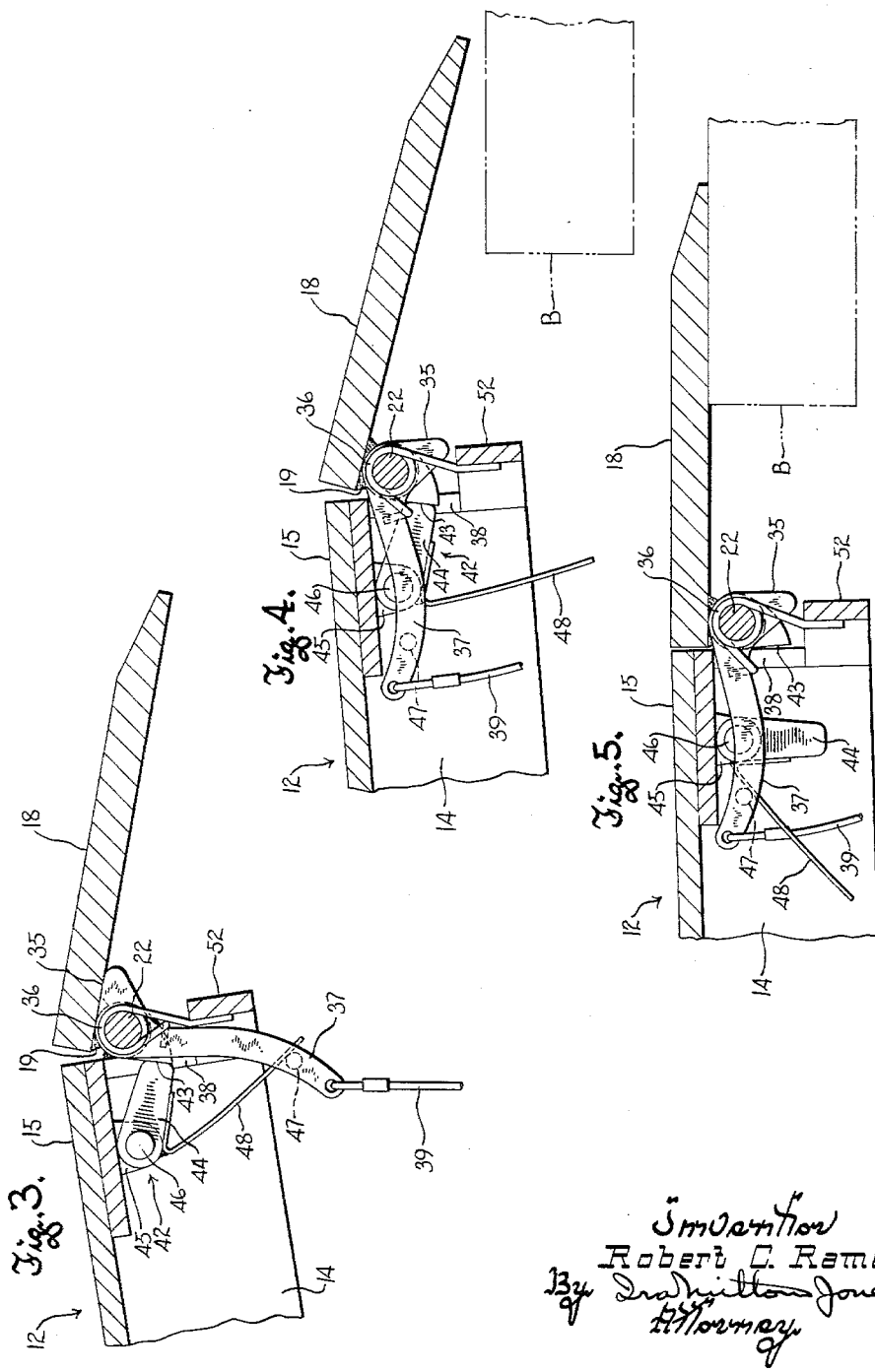

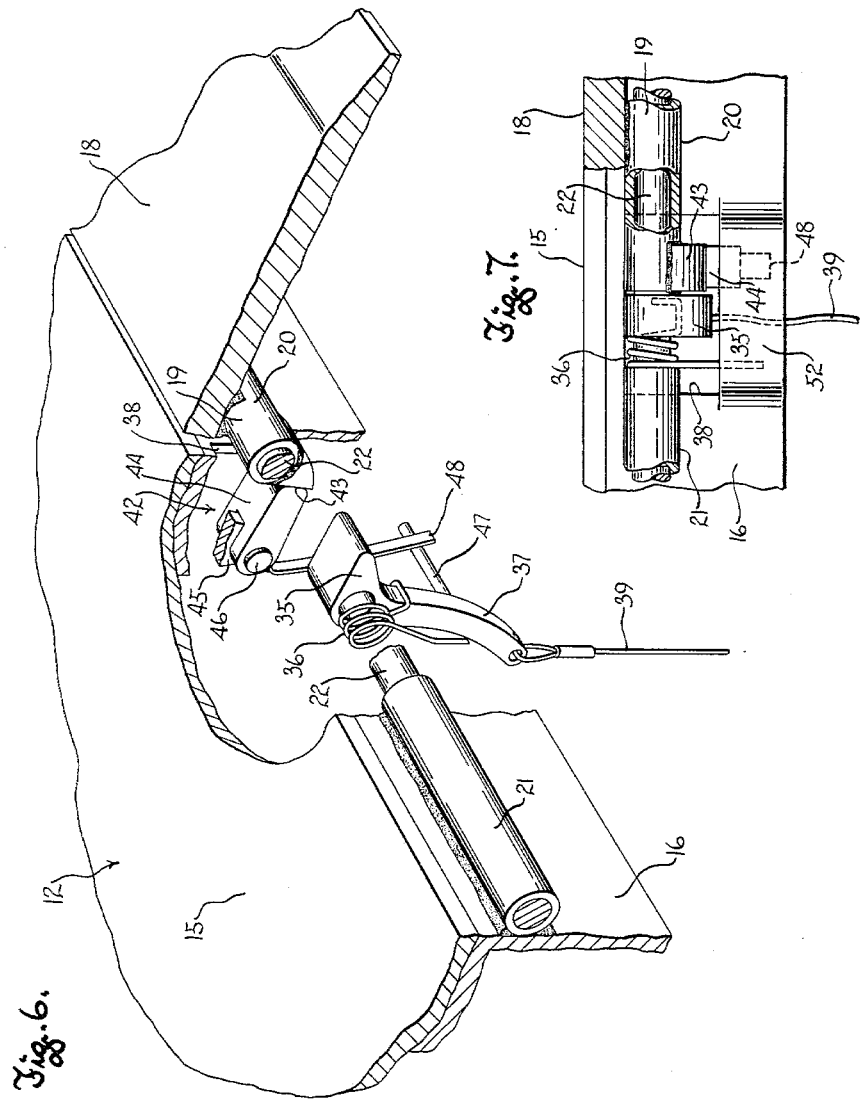

3,199,133
ADJUSTABLE DOCKBOARD WITH IMPROVED LIP-LIFTING AND HOLDING MEANS

Robert C. Ramer, Milwaukee, Wis., assignor to Kelley Company, Inc., Milwaukee, Wis., a corporation of Wisconsin
Filed Oct. 9, 1962, Ser. No. 229,422
1 Claim. (Cl. 14—71)

This invention relates to adjustable dockboards adapted for installation on loading docks to span the gap between the dock and the bed of a truck or other carrier in position to be loaded or unloaded.

Dockboards of this type have a ramp which is hingedly mounted at its rear edge with the front edge of the ramp adjacent to the front of the loading dock upon which the board is installed; and in the dockboard of this invention an extension lip is hinged to the front edge of the ramp. When the dockboard is not in use, this extension lip normally hangs in a pendent position from which it is elevated to form substantially an extension of the ramp, and to rest upon the bed of a carrier in position in front of the dockboard.

The entire structure is set into a shallow pit, so that the rear hinged edge of the ramp is flush with the top of the dock. The ramp thus may occupy a cross-traffic position flush with the top of the dock, from which it may be swung either downwardly or upwardly to accommodate trucks of different floor or bed heights. Biasing means—generally a group of heavy coil springs—acting through a pivoted lever arm, at all times urges the ramp upwardly but is restrained from doing so by a manually releasable hold-down device.

As in the adjustable dockboard forming the subject matter of the pending application for patent filed by Garrett P. Kelley, Serial No. 107,976, now abandoned, the extension lip is automatically swung to an elevated position as the ramp rises upon release of the hold-down device. The means by which this automatic elevation of the extension lip is effected includes a snap line, i.e. a wire rope or cable, having one end thereof connected to the stationary mounting structure of the dockboard and its other end connected to an actuating lever which forms part of the lip lifting mechanism.

The angle to which the extension lip is automatically elevated as the ramp rises is somewhat short of its fully elevated position in which it is substantially flush with the ramp, and when the extension lip reaches this partially elevated position, lip holding or supporting means automatically move into position to support the lip against dropping so that as the ramp is lowered by the application of a weight thereon—for instance by an attendant walking out on to it, the extension lip will come to rest upon the bed of a carrier in position in front of the dockboard.

The lip lifting mechanism which, as indicated, includes a snap line connected between the stationary mounting structure and an actuating lever forming part of that mechanism, returns automatically to its inactive position as the ramp is lowered; but the lip supporting means remains operative until it is relieved of the weight of the lip as when the lip comes to rest upon the bed of a carrier. At that instant the lip supporting means moves out of its operative lip supporting position so that when the carrier pulls away the lip may drop to its pendent position.

Dockboards equipped with suitable mechanism and structure to accomplish all of the aforesaid operations are, of course, not new, the aforesaid Kelley application being an example of dockboards so equipped; and while the lip lifting and holding means of these past dockboards have been entirely satisfactory from an operating standpoint, they have one disadvantage which the present invention overcomes. In these past structures, much of the mechanism to elevate and support the extension lip projected beyond the front edge of the ramp and, more specifically, beyond the rail or apron which depends from the front edge of the ramp to provide rigidity and support therefor. Being thus exposed, these parts of the lip lifting and holding mechanism were vulnerable to damage as a result of trucks backing into the dockboard. This danger has always been recognized, but heretofore there has been no practical solution to the problem, since all prior lip lifting mechanisms had to have a substantial portion thereof located in front of the apron or rail at the front edge of the ramp.

This invention succeeds in overcoming this objection through the provision of an improved lip lifting and holding mechanism wherein practically all of the structure— and certainly all of the more easily damaged parts thereof —are behind or rearwardly of the front rail or apron of the ramp. Only a very small portion of the mechanism can be said to be exposed at the front edge of the ramp, and that part thereof which is so exposed is directly contiguous to the hinged axis of the extension lip where it is most unlikely to be struck by a truck backing into place.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention, constructed according to the best mode so far devised for the practical application of the principles thereof, and in which:

FIGURE 1 is a longitudinal sectional view through an adjustable dockboard installation embodying the improved lip lifting and holding mechanism of this invention, and illustrating the ramp in its cross-traffic position with the extension lip hanging in its pendent position from the front edge of the ramp;

FIGURE 2 is an enlarged fragmentary cross sectional view through the front end portion of the ramp and extension lip, but on a plane spaced laterally from that of FIGURE 1;

FIGURE 3 is a cross sectional view through the front end portion of the ramp and the extension lip, illustrating the ramp in its raised position and the extension lip elevated to its partially raised position by the lip lifting mechanism;

FIGURE 4 is a view similar to FIGURE 3, but showing the ramp lowered and the lip lifting mechanism returned to its inoperative or inactive position, so that only the lip holding mechanism supports the lip in its partially elevated position;

FIGURE 5 is a view similar to FIGURES 3 and 4, but illustrating all of the lip holding mechanism as well as the lip lifting mechanism in its inactive or inoperative position as a result of the weight of the extension lip being supported by the bed of a carrier or truck in position in front of the dockboard;

FIGURE 6 is a fragmentary perspective view of the front end portion of the ramp to better illustrate lip lifting and holding mechanism;

FIGURE 7 is a fragmentary front view of that part of the front end portion of the ramp at which the lip lifting and holding mechanism is located, showing this mechanism in its inoperative position as in FIGURE 5; and FIGURE 8 is a bottom view of the lip lifting and holding mechanism, said view being taken on the plane of the line 8—8 in FIGURE 1.

Referring now particularly to the accompanying drawings, in which like numerals indicate like parts throughout the several views, the numeral 5 designates the stationary mounting structure of the dockboard, which may be constructed in any suitable manner but is preferably fabricated from structural steel. It has parallel front and rear members 6 and 7 connected by parallel rails 8 (only one of which is shown). At its rear, the supporting structure has a plurality of upright members 10, again only one of which is shown, which collectively support a cross member 11 to which the rear elge of a ramp (indicated generally by the numeral 12) is hingedly connected, as at 13.

The ramp 12, like the frame or stationary structure, is preferably built of structural steel including a plurality of parallel longitudinal rails 14 (only one of which is shown) and a steel plate or deck 15 welded or otherwise secured to the rails 14. At its front edge, the ramp has an apron or rail 16 depending from its deck 15, which is welded or otherwise secured to the longitudinal rails 14. If desired, this front rail or apron may be one flange of an angle iron. At its rear, the ramp also has an angle iron cross member 17 which is secured to the rails 14 and to the underside of the deck, the hinge 13 having one of its complementary parts secured to this angle iron cross rail 17.

An extension lip 18 is hinged to the front edge of the ramp, as at 19, to swing from a pendent position to an elevated working or operative position forming substantially an extension or continuation of the deck 15 of the ramp. The hinge 19 which connects the extension lip with the front edge portion of the ramp, consists of lengthwise interposed tubes 20 and 21, respectively fixed to the underside of the hinged lip and to the apron or front rail 16, with a hinge pin or pintle 22 extending through the tubes. The hinge 19 is of the knuckle joint variety since the rear edge of the lip engages the front edge of the ramp deck when the lip is in its raised working position, and thus prevents further elevation of the lip. Accordingly, in use, when the hinged lip comes to rest upon the bed of a carrier, the ramp will be supported at its front by the carrier.

When the dockboard is installed on a loading dock, the entire structure is set into a shallow pit 23 formed in the dock 24 with the hinged rear edge of the ramp flush with the top of the dock and its front edge adjacent to the front of the dock. Hence the ramp may occupy a cross-traffic position flush with the top of the dock, as shown in FIGURE 1, and may be tilted downwardly to lower its front edge to the level of the floor of a truck or other carrier in position in front of the dock in the event that the floor of the carrier is below dock level; or it may be raised to a substantial angle above dock level.

The ramp is biased upwardly by means of a group of heavy tension springs 25 (only one of which is shown) anchored at one end to the mounting structure 5, and having their other ends connected to a lever arm 26. One end of the lever arm is hingedly connected to the supporting structure, and its other end bears against the bottom edge of a cam plate 28 fixed to the underside of the ramp. Hence, the springs 25 acting through the pivoted lever arm and the cam plate, impart an upward thrust to the ramp tending at all times to raise the same to an upwardly inclined position extending a substantial distance above dock level. However, the ramp may be held in any lowered position by means of a hold-down device, indicated generally by the numeral 29, which may be like that shown in the aforesaid pending application, Serial No. 107,976.

A releasing arm 30 with which the hold-down device is equipped, has a releasing cable or cord 31 connected thereto, the cable having a finger ring 32 accessible from above the deck of the ramp, to enable the same to be manually pulled to release the hold-down device and thereby permit the ramp to be raised from its cross-traffic position in which it is supported by legs 33. The legs 33 and the manner in which they function to support the ramp in its cross-traffic position, and even in a position below dock level, constitutes the subject matter of another pending application, Serial No. 177,598, filed March 5, 1962, by the instant applicant and a coinventor.

The structure thus far described constitutes no part of the present invention, but a thorough understanding thereof is essential to an adequate evaluation of the improvement in dockboards effected by this invention.

As noted hereinbefore, when the ramp is swung to its raised position in consequence of the hold-down means being released, the hinged extension lip 18 is automatically swung to an elevated position somewhat short of its fully elevated position. The means by which this is done comprises a relatively short lip-lifting finger 35 pivotally mounted at the front edge portion of the ramp to swing about an axis parallel to the hinge axis of the lip and preferably coinciding therewith. Most conveniently, the lip-lifting finger 35 is pivotally mounted on the pintle 22, preferably somewhere near the center of the ramp. The adjacent tubes 20 and 21 are spaced from one another to accommodate the finger 35, and to also accommodate a torsion spring 36 which biases the lip-lifting finger to a retracted or inactive position. The coils of the spring encircle the pintle 22 and its ends bear against the finger 35 and the rear of the front rail or apron 16.

The lip-lifting finger is swung forwardly and upwardly from its retracted position by a downward pull on an actuating lever 37, which is fixed with respect to the lip-lifting finger and preferably is integral therewith, so that the finger and the lever may be considered a bell crank. When the lip-lifting finger is in its retracted position to which it is urged by the spring 36 the lever 37 extends rearwardly from the finger through a hole 38 in the front rail or apron 16 of the ramp to occupy a position directly beneath the adjacent portion of the ramp deck.

Attached to the extremity of the actuating lever 37 is one end of a snap line or cable 39. The other end of this snap line is connected to the stationary mounting structure 5 through a tension spring 40. The snap line is of such length that when the ramp is raised by the springs 25 the snap line becomes taut and exerts a downward pull on the actuating lever to thereby swing the lip-lifting finger upwardly and forwardly. Since the lip-lifting finger bears against the underside of the hinged extension lip (which faces rearwardly in the pendent position of the lip) when the lip-lifting finger is in its retracted position it follows that the upward and forward motion thereof in consequence of tightening of the snap line elevates the extension lip. The angle to which the extension lip is thus elevated depends upon the length of the snap line and the height to which the ramp is raised by the springs 25 but it must be sufficient to enable a lip holding mechanism indicated generally by the numeral 42 to be activated.

The lip holding mechanism comprises a rearwardly facing abutment 43 fixed with respect to the extension lip preferably by being welded to one of the tubes 20 in line with the opening 38. This rearwardly facing abutment 43 coacts with a lip-holding member 44, which is pivotally supported from the underside of the ramp, as by being pivoted to a downwardly projecting ear 45 welded to the underside of the deck or to the adjacent flange of the angle iron which provides the front rail or apron 16. Preferably the holding member 44 is bifurcated to receive the ear 45 to which it is connected by a pin 46.

Normally the lip-holding member 44 hangs by gravity in a pendent inactive position, as shown in FIGURES 1 and 5, from which position it is swung forwardly to a substantially horizontal position engaging the rearwardly facing abutment 43, in consequence of elevation of the hinged extension lip. To thus activate the holding member 44, a rigid finger or rod 47 fixed to the actuating lever 37, collides with a leaf spring or blade 48 fixed to the holding member 44 as the actuating member swings downward and forward in its lip lifting function.

The leaf spring 48 accommodates over-travel and obviously the engagement of the rod or finger 47 with the spring constitutes a unidirectional motion transmitting connection, so that when the ramp is lowered and the snap line 39 becomes slack, the lip-lifting finger 35 and its actuating lever 37 may be returned to their inoperative positions by the spring 36 without in anywise affecting the lip supporting member 44, which remains in its operative lip supporting position due to the frictional engagement of the rearwardly facing abutment 43 with its outer end, and the fact that the thrust imposed upon the supporting member 44 is along a line which is substantially the longitudinal axis of the member 44. The force imparted to the member 44 by the weight of the extension lip, thus imparts no turning moment to the member 44. However, just as soon as the holding member 44 is relieved of the weight of the extension lip, as by the lip coming to rest upon the bed of a carrier, gravity returns the holding member to its pendent or retracted position. Consequently, as the carrier pulls away, the extension lip will automatically drop to its pendent position, rubber bumpers 50 cushioning the shock and spacing the lip from the apron or rail 16.

From the foregoing description, taken in connection with the accompanying drawings, it should be apparent to those skilled in this art that this invention eliminates an objection that has been inherent in adjustable dockboards of the type wherein an extension lip hinged to the front edge of the ramp is automatically swung to an elevated position, since it locates nearly all of the lip-lifting and holding mechanism behind the front rail or apron of the ramp, and disposes those portions of this mechanism which must be forwardly of the front rail or apron, closely adjacent to the hinge axis of the extension lip where it is extremely unlikely that a truck backing into position will strike them.

To further guard against damage of any part of the mechanism by a truck backing into it, the front rail or apron 16 has a forwardly projecting guard 52 in line with the lip-lifting and supporting mechanism, and preferably this guard is formed by simply striking forward that portion of the rail or apron which lies beneath the hole 38.

What is claimed as my invention is:

In an adjustable dockboard of the type wherein a ramp having front and rear edges has its rear edge hingedly connected with stationary mounting structure to swing up and down, and has an extension lip hingedly connected to its front edge to swing between a pendent position and an elevated position forming substantially an extension of the ramp, the combination of:

(A) an apron fixed to and depending from the front edge of the ramp, said apron having a hole therethrough;

(B) means located in front of said apron near the top thereof, forming a hinge connection between the ramp and the extension lip, said hinge connection including a hinge pin;

(C) a bell crank lever pivoted on said hinge pin in line with the hole in the apron to rock about the axis of the hinge connection between an operative position and an inoperative position, said bell crank lever having
 (1) a short lip lifting finger which is engageable with the adjacent portion of the extension lip to elevate the lip as the bell crank lever is rocked from its inoperative position to its operative position, and
 (2) an actuating arm projecting rearwardly through the hole in the apron to occupy a position extending rearwardly along the underside of the ramp when the bell crank lever is in its inoperative position, and to occupy a downwardly directed position behind the apron when the bell crank lever is in its operative position;

D. biasing means acting upon the bell crank lever yieldingly maintaining the same in its inoperative position;

(E) a snap line connected to the actuating arm of the bell crank lever and the stationary structure to exert a downward pull on the arm as the ramp rises, to thereby rock the bell crank lever to its operative position and elevate the lip;

(F) a rearwardly facing abutment fixed with respect to the extension lip near its hinged connection with the ramp and in line with the hole in the apron;

(G) a lip supporting member pivotally mounted behind the apron at the underside of the ramp in line with said abutment, said lip supporting member normally occupying a pendent position from which it may be swung to a raised forwardly projecting operative position engageable with said abutment through the hole in the apron, to support the extension lip in a partially elevated position; and (H) cooperating means on the bell crank lever and the lip supporting member to swing the latter to its operative position as the bell crank lever is rocked to its operative position, said cooperating means including a spring through which motion of the bell crank lever is imparted to the lip supporting member.

References Cited by the Examiner
UNITED STATES PATENTS

| 1,262,930 | 4/18 | Diaz | 94—2 |
| 2,972,762 | 2/61 | McConica | 14—71 |
| 2,974,336 | 3/61 | Kelley | 14—71 |
| 3,117,332 | 1/64 | Kelley | 14—71 |

JACOB L. NACKENOFF, *Primary Examiner.*